Sept. 30, 1958 J. CORRIGAN 2,853,960
CONDENSATION-RESISTANT CAR CONSTRUCTION
Filed June 24, 1954 5 Sheets-Sheet 1
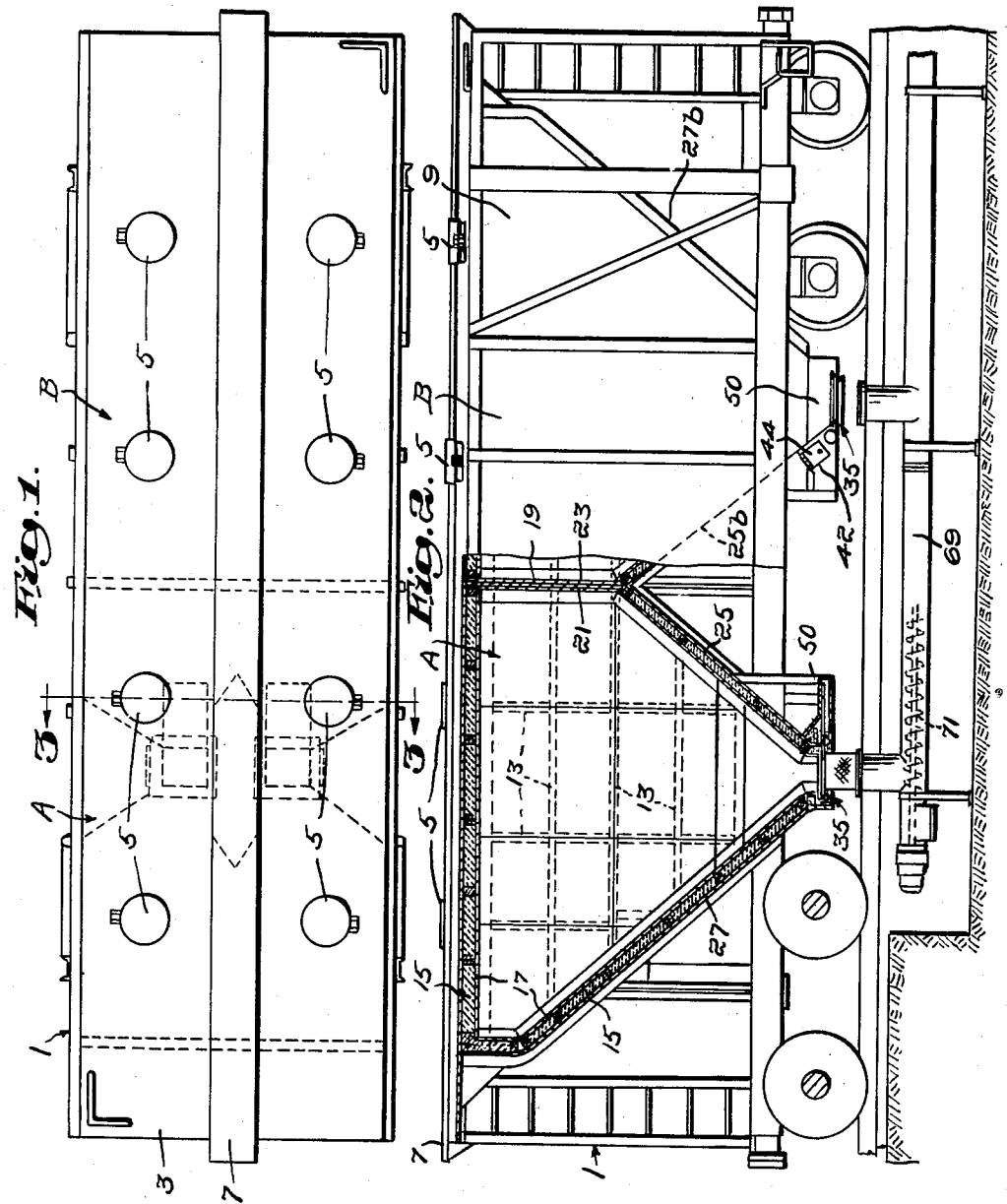
Inventor:
Joseph Corrigan,
by
Attorney

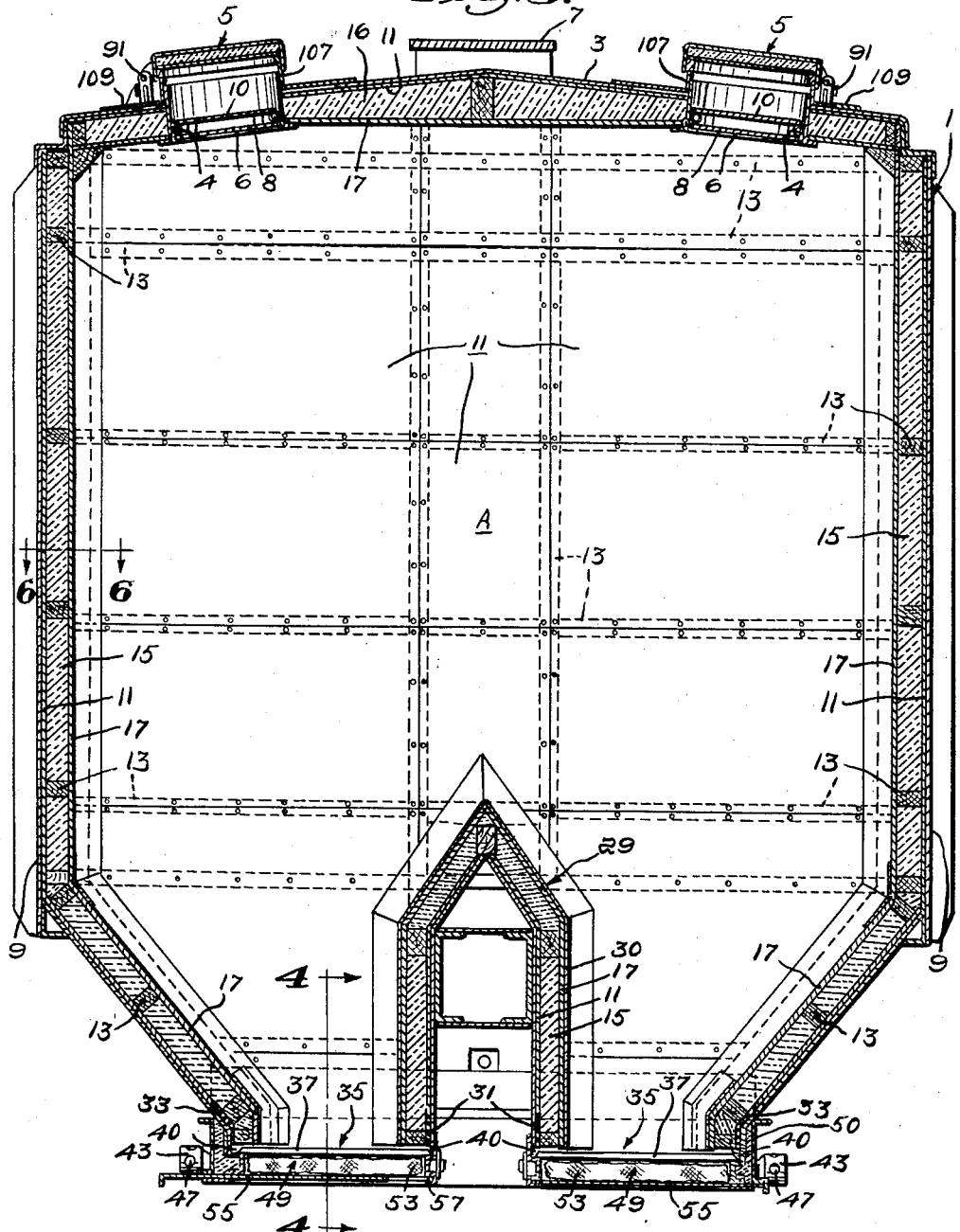

Sept. 30, 1958  J. CORRIGAN  2,853,960
CONDENSATION-RESISTANT CAR CONSTRUCTION
Filed June 24, 1954  5 Sheets-Sheet 3
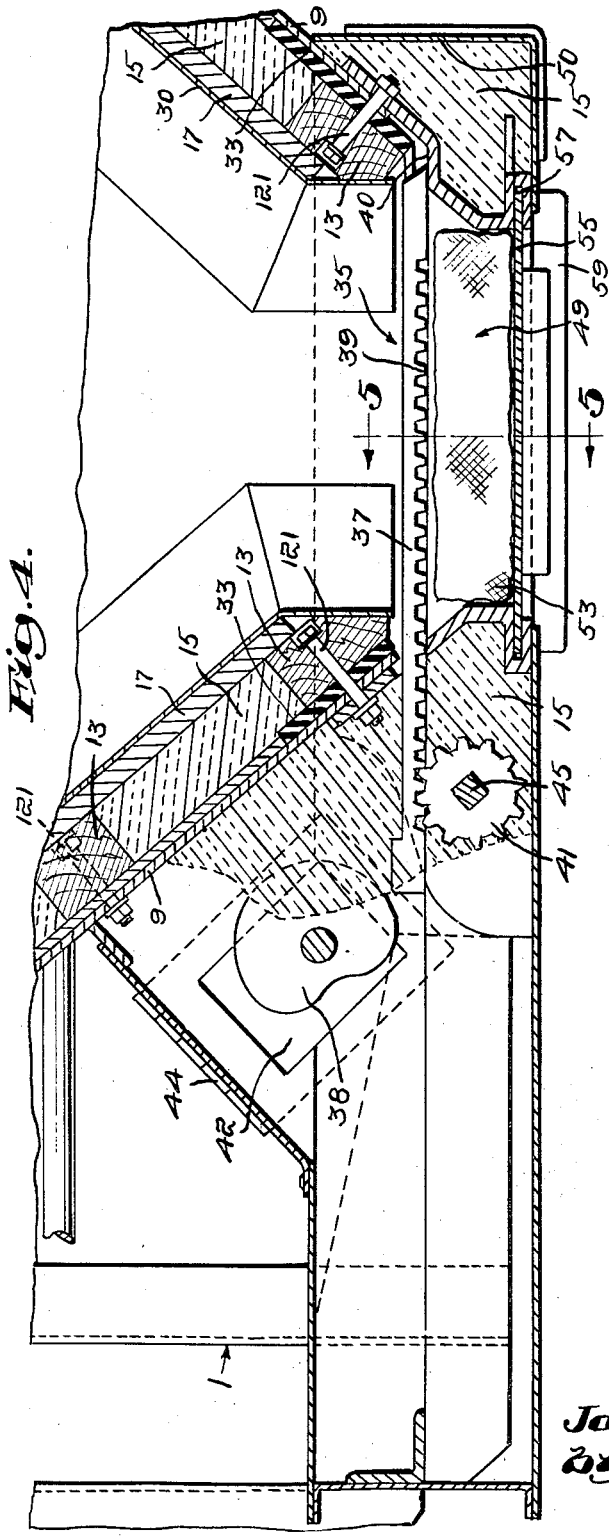
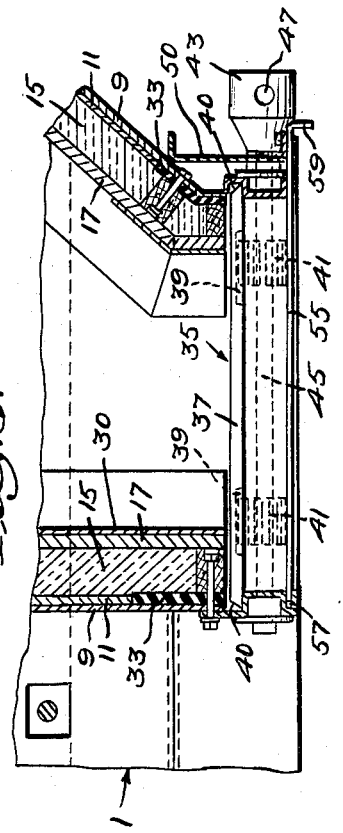
Inventor:
Joseph Corrigan,
by
Attorney

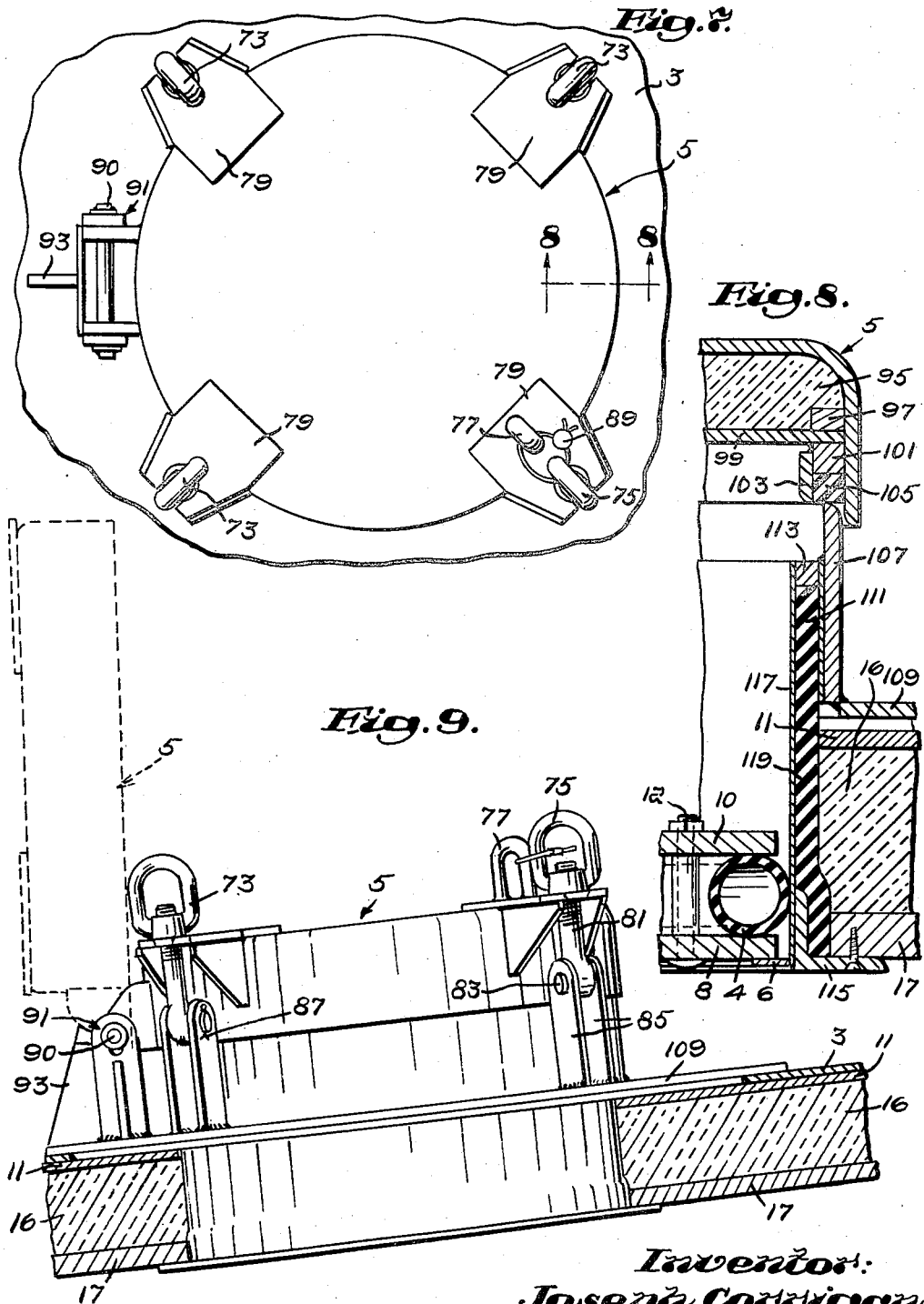

Sept. 30, 1958 J. CORRIGAN 2,853,960
CONDENSATION-RESISTANT CAR CONSTRUCTION
Filed June 24, 1954 5 Sheets-Sheet 5
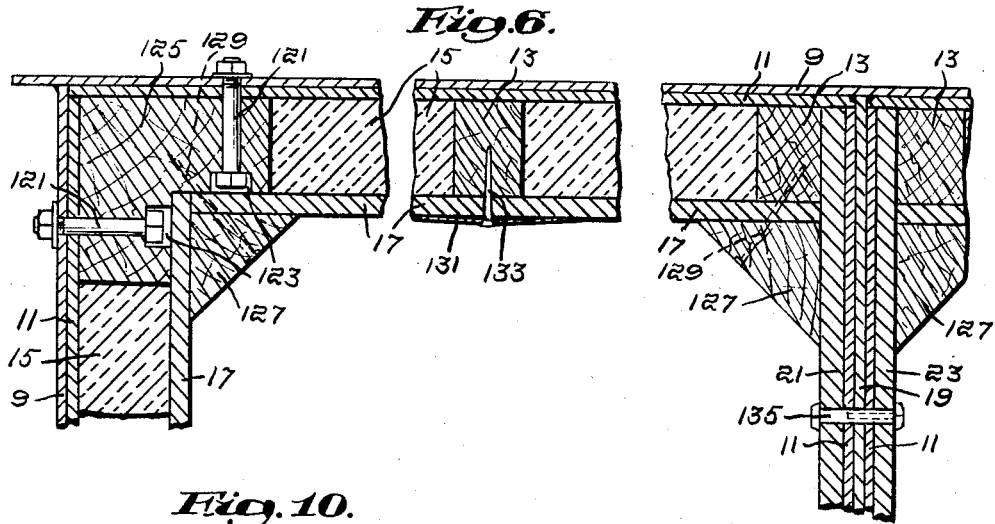
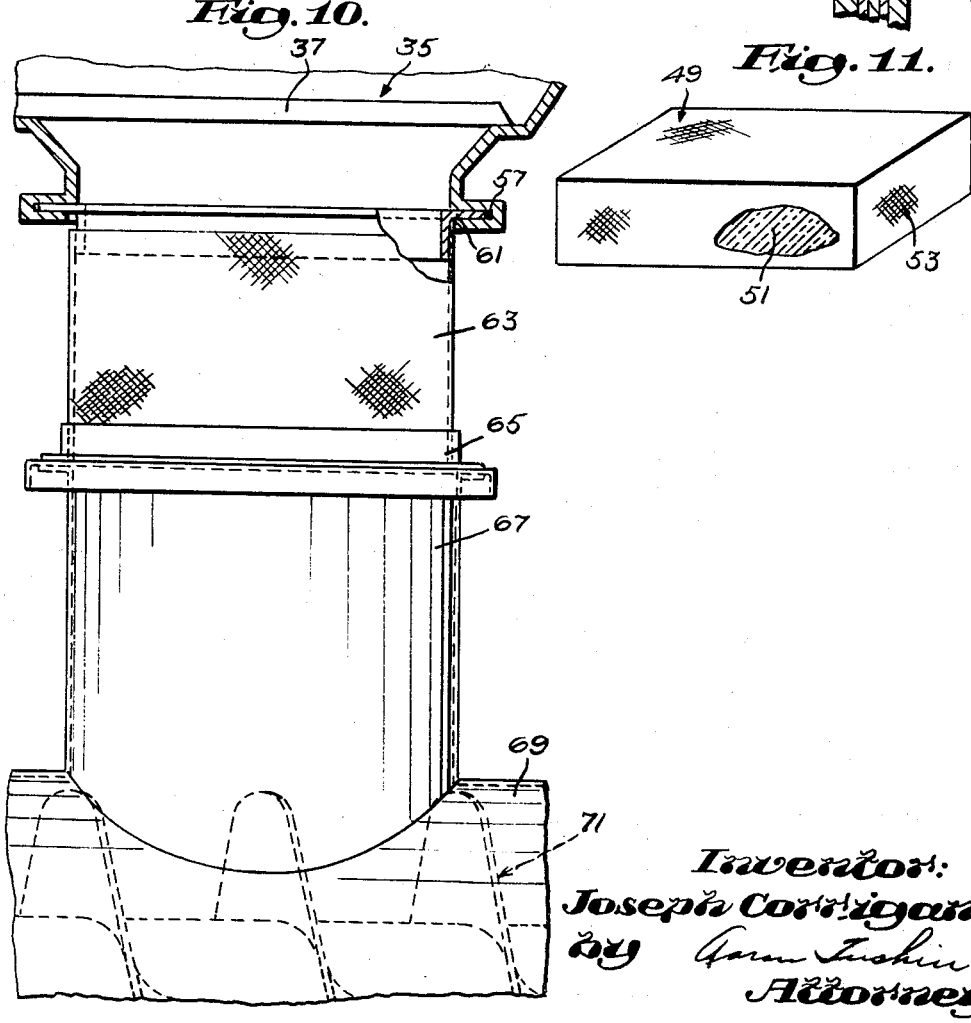
Inventor:
Joseph Corrigan,
by
Attorney // patent text

2,853,960

CONDENSATION-RESISTANT CAR CONSTRUCTION

Joseph Corrigan, Newton Center, Mass., assignor to J. C. Corrigan Company, Inc., Dorchester, Mass., a corporation of Massachusetts Application June 24, 1954, Serial No. 439,116

6 Claims. (Cl. 105—423)

This invention relates to cars designed for the transportation, in bulk, of powdered or granulated materials and more particularly to steel, cement-type freight cars redesigned for the insulation and protection of hygroscopic powdered or granulated materials such as sugar, flour, salt, etc., which are transported in bulk.

Formerly sugar was transported to the plants of large scale consumers in 100 pound bags. It was normal for dirt and dust to be on the exterior surfaces of these bags and often, pieces of paper and other contaminants were found in the bags. Regardless of precautions, it was practically impossible to prevent foreign material from entering the finished products in which the sugar was used. Furthermore, handling the bags of sugar was inevitably accompanied by leakage, breakage, and waste and was a relatively expensive procedure.

Now under the new system discussed below sugar arrives at the consumer's plant in hermetically sealed freight cars that have smoothly finished and well insulated interiors. The sugar is loaded, unloaded, transferred to the consumer's plant and located for convenient use, all by automatic machinery that preserves the cleanliness of the sugar.

The bulk sugar is transported to the plant in cars that resemble standard railroad cement-type hopper cars with a capacity of about 80,000 pounds. At the sugar refinery controlled amounts of sugar are passed through openings or fill-hatches in the top of the car that are hermetically sealed after the car is full. Specially constructed unloading outlets at the bottom of the car permit the sugar to be transferred directly from the car to storage bins inside the plant of the sugar consumer. During all phases of this transfer sequence the sugar remains fully enclosed in pipes or containers that ensure maintenance of the sugar's original quality and cleanliness.

To unload a car the unloading outlets, or discharge gates, at the bottom of the car are opened and the sugar flows into a screw type conveyor which takes it to the plant. There the sugar enters a vertical bucket elevator and is carried to a horizontal screw type conveyor at the top of the storage bins. Gate arrangements channel the sugar to the proper bins. When it is to be used controlled amounts of the sugar are automatically weighed and then conveyed to the processing tanks. If the sugar is not to be used for some time it usually is recirculated every so often to various bins in the plant. Such motion and transfer of the sugar prevents caking.

Because so much of the loading, unloading and transfer processes to which the bulk sugar is subjected are automatic considerable savings in wastage and labor costs can be effected while ensuring maintenance of the sugar's original quality and cleanliness.

Granulated or powdered sugar is usually at temperatures of about 90° to 130° F. when it is loaded in bulk, into freight cars for transportation. In spite of these relatively high temperatures, moisture, in the form of water vapor is absorbed on the surfaces of the granulated or powdered sugar or is trapped in the interstices within the mass of sugar. On the other hand, and particularly in winter, the steel walls and roof as well as the floor of the car have much lower temperatures than that of the sugar. Consequently the difference between the temperature of the freshly loaded sugar and that of the car interior surfaces may approximate 100° F. Furthermore, the summar time presents very humid, moist days, with frequent sudden showers of cool evenings, all of which conditions favor condensation of moisture within conventional steel framed cement-type railroad cars.

As a result of this temperature difference the water vapor in the air brought into the car with the sugar or through small openings or cracks at joints, fill holes, discharge gates, etc., will condense upon contact with these cold surfaces to form liquid water. Then, because sugar is soluble in water, the sugar dissolves in the condensed moisture and melts to form a caked layer that clings to the car surface. This first condensation of water vapor in the vicinity of the car surfaces reduces the water vapor pressure in this vicinity relative to that of water vapor absorbed or trapped in sugar located at some small distance from the cold surfaces of the car. The resulting difference in vapor pressures causes water vapor somewhat removed from the car surfaces to migrate toward these surfaces, where, after condensation, more sugar is dissolved and the thickness of the caked layer is increased.

These layers of caked sugar, which can be of considerable thickness, are difficult to remove, cause waste of sugar, and seriously impede the free flow of the granulated or powdered sugar during its removal from the freight car. In exaggerated cases the caking of sugar in the vicinity of the discharge gates has been known to be so hard and of such size as to completely block the flow of the sugar out of the car necessitating the return of the entire car to the refinery for removal by steaming resulting in large losses of sugar.

For example in the case of bulk transportation of granulated sugar the mass of sugar entering the car from the dryers is at a temperature somewhere between 90° F. and 130° F. and has a moisture content of from 0.01% to 0.03% by volume adsorbed in the particles or trapped between them. In the usual freight car which can contain about 80,000 pounds of sugar, this moisture has a total weight of from ten to thirty pounds. During most temperature conditions wherein the car walls are colder than the sugar this moisture migrates from all sections of sugar mass toward the wall surfaces. There the moisture condenses and gives rise to the undesirable caked sugar and the accompanying serious disadvantages described above.

Also entrance into the sugar of moisture from the air or other sources outside the car must be prevented during transit of the sugar or its storage in the car, for such moisture would aggravate the difficulties described above. Also, during such transit or storage, all entrance into the car of dust, dirt, smoke, grime, mice, etc., must be prevented to maintain the sanitary quality of the sugar at its original level.

Prior attempts to overcome condensation of adsorbed water vapor and the caking of hygroscopic material during its bulk transportation in freight cars consisted of providing barriers, such as asphalt, paper, or wood or moisture absorbent materials, such as dry felt, which are placed as linings on the walls and roof of the car. Other linings and insulating materials have been used but all have proven unsatisfactory and inefficient. Moisture from the hygroscopic material in the car condenses on such types of lining material and, after wetting the hygroscopic material, causes the difficulties described above.

From the above discussion of the effect of condensed moisture on bulk hygroscopic materials it is apparent that the ideal freight car for the transportation of these materials, such as that described in this invention, is a car that is condensation-resistant, i. e. a car that during transit, maintains the original level of dryness and cleanliness of the material, does not permit or encourage the condensation of water vapor originally adsorbed by the hygroscopic material and does not permit the entrance of external atmosphere or contaminants into its interior.

On the other hand refrigerator cars, built to transport perishable food such as fruits, fish, etc., function differently from cars properly designed to transport hygroscopic materials. For the preservation of the perishable food the refrigerator car includes expensive mechanisms which maintain moisture as well as cold and moist air in contact with the food.

The insulating materials and methods of the condensation-resistant car described in this invention do not permit condensation of water vapor within the car and do prevent the entrance of water vapor, rain, dust, rats, smoke or dirt into the car. However, these definitely improved methods and insulating materials are for different purposes and of different characteristics than the methods of insulating materials employed in refrigerator cars or the methods and materials employed in prior freight cars intended to transport hygroscopic material.

It is the object of this invention to overcome the disadvantages of the known prior attempts to avoid condensation of moisture during the handling of bulk transportation in cars of hygroscopic material such as granulated or powdered sugar, flour, salt, chemicals, etc.

Another object is to provide adequate and novel insulating means for converting standard steel cement cars to condensation-resistant cars, suitable under all conditions of atmosphere, temperature and humidity, for the transportation in bulk of granulated or powdered sugar or other hygroscopic material in such forms.

Another object of this invention is to provide effective insulation of the top, side and bottom interior surfaces of a car to prevent condensation of moisture within said car.

A further object is to provide means in the top fill-hole hatches of the car for sealing, insulating, and protecting the material within the car from external atmosphere, temperature, humidity or contaminants. Another object is to provide means in the discharge gates of the car for sealing, insulating, and protecting the material within the car from the external atmosphere, temperature, humidity or contaminants.

Another object is to prevent infiltration of moisture laden air, dirt, dust, grime, smoke or other contaminants into the car through all openings, walls and joints.

Another object is to prevent external temperature changes from affecting the internal temperature of the car by passing through any opening, wall or joint.

These and other objects will become apparent in the further description of my invention.

While the invention is shown applied to the conversion of standard steel cement carrying cars to condensation-resistant cars for transporting sugar in bulk, it is apparent that the invention may be applied in the construction of a new car adapted for the bulk transportation of hygroscopic materials.

In the drawings:

Figure 1 is a plan view of a railroad car showing the fill hatches and discharge gates;

Figure 2 is a side elevational view of the railroad car of Figure 1 partly broken away to show one section of a double unit and which includes the discharge unit and conveyor system attached thereto for withdrawal purposes;

Figure 3 is a cross section view of the car taken on line 3—3 of Figure 1;

Figure 4 is an enlarged partial sectional view taken on line 4—4 of Figure 3;

Figure 5 is a cross sectional view on line 5—5 of Figure 4;

Figure 6 is a section taken on line 6—6 of Figure 3 showing the corner and wall construction on an enlarged scale;

Figure 7 is a plan view of one fill hatch;

Figure 8 is a partial cross sectional view on line 8—8 of Figure 7;

Figure 9 is a side elevational view of one fill hatch with the roof of the car in cross section;

Figure 10 is an enlarged view of the lower end of the discharge gate to show attachment of the withdrawal system;

Figure 11 is a perspective view of an insulating pillow.

Referring now to the drawings, and particularly to Figures 1, 2 and 3, car 1 consists of two sections A and B with top 3, steel sidewalls 9 having Masonite panels 11, studding 13 with corkboard 15 and with an inner-layer of plywood, 17, attached thereto. The steel plate top 3 of the car is abutted with Masonite 11, insulating glass wool 16 and a final insulation of plywood 17. Section joining walls 19 have plywood 21—23 attached thereto on both sides. At the open sloping walls between sections A and B, 25, the construction is the same as the side walls. The sloping outer walls 27 are of similar construction as the inner sloping side walls. Between the inner and outer sloping walls 25 and 27 there is a bridge 29 which provides for brake rods to pass therethrough (Figure 3). At the lower end of the bridge there is a short piece of rubber insulation 31 and on the outer walls at the lower end of discharge gate 35 there is a cylinder of closed-cell sponge rubber insulation 33 which encircles the discharge opening and prevents moisture and cork fines from working into the sugar. The entire surface of bridge 29 is covered with stainless steel 30.

The discharge unit (Figures 4 and 5), generally shown as 35, comprises a conventional sliding gate 37 with rack teeth 39 on the under side thereto meshing with pinions 41. Discharge gate 37 is slidably mounted in a recess 40. The operating mechanism for this gate consists of a shaft or hub 43 with a shaft 45 driven by pinions 41. Hub 43, as shown, is operated manually by pins (not shown) inserted in openings 47 and rotated thereby. Sliding gate 37 is locked into place by cam 38 which is enclosed in housing 42, the latter having a cover plate 44.

Beneath gate 37 is an insulating pillow 49 of cork, spun glass, etc. 51, enclosed in cloth 53 (see Figure 11) which is removable at the time of discharge of the car contents. Underneath the insulating pillow 49 there is located a slideable hand operated gate 55 slideably mounted in grooves 57 for finger grip and adapted to be pulled out manually. In groove 57 there is a right angle frame 61 of a conveyor system 71 (see Figure 10) to which is attached a canvas sleeve or stocking 63 for adjustment and height, and at its lower end is a conventional right angle piece 65 welded to an upright metal tubing 67 which communicates with a horizontal tubing 69 of a conveyor 71. The canvas sleeve 63 may be permanently fastened to the upright metal tubing 67 to be folded therein when not in use to prevent loss thereof, and may be pulled up and fastened to the lower gate opening when needed. The entire bottom of the discharge gates are enclosed with one large removable steel insulating cover 50. This is true whether the car is provided with single or (in larger cars) twin pairs of discharge gates. This cover protects the gates from water or dirt that may be thrown up by the wheels of the moving car.

Fill-holes or hatches 5 (Figures 7, 8 and 9) comprise a plurality of locks 73 one of which 75 is used for sealing the hatch. Lock 75 has an eye 77 welded to the base of the plate 79. Lock 75 has a tieing bolt 81 and pivot 83 attached to upright ears 85. Pivot 83 when installed is welded to upright ears 85 while the pivots for the other locks 73 have cotter pins or the like 87. The purpose of the welding in one of the locks 75 is to secure the top cover to become tamper proof. A conventional seal 89 is secured through both eyes of lock 75.

Cover 5 is hinged at the outward side of the car as at 91 with pivot 90 welded thereto. The hinge 91 is provided with a rest or stop 93 which prevents the cover 5 from tipping too far back and in addition in the event that a cover is left open accidentally, the angle is such that the slightest movement of the car sidewise will throw the cover off center and cause it to close. Cover 5 on its under side comprises insulation 95 (Figure 8) of wood, ridge 97 against which a wood or Masonite paneling 99 is attached. On the under side of the wood paneling 99 there is a stripping 101 of metal to which is attached a metal downwardly position arm 103 which forms a recess with the downward portion of cover 5 for rubber insulation strip 105. The inlet hatch includes an upward collar 107 which is welded to the cover plate 109 which in turn is welded to the car rooftop 3. Sleeve 107 has on its inside surface rubber insulation 111 to which is attached a metal collar 113 at its upper side and at its lower end a right angle member 115 which is attached by suitable means to the plywood 17. On the innermost surface of collar 113 there is secured a metal liner 117 by welding to the collar 113, and right angle piece 115. Between members 117 and 111, extending the full length from the under side 113 to the upper side of 115 is insulation 119 of closed-cell rubber.

Figure 6 shows the metal outer wall 9 of car 1 with Masonite 11 adjacent thereto and secured by bolts 121 at a plurality of places to hold the studding and Masonite in place. These bolts are welded on the outside to the steel frame of the car to prevent loosening and eventual leakage of outside moisture into the car. Between the open areas of the studding corkboards 13 are inserted. The recess for the bolts are shown as at 123. Wood corner posts 125 are of much larger construction and are then cut down to fit conveniently to the inside corner construction as one piece. To back up all corners there are wedge shape members 127 made of wood and held in place by nails 129. At places where the plywood panels meet, preferably at the point of one of the studdings 13, a metal spring strip 131 of stainless steel is held in place by nails 133, so that the insertion of the nails seal the edges of the plywood at the edges of the joint. This entire construction is held together preferably by male and female bolts as shown at 135.

Within the openings of fill-hatches 5 there are circular flanges 6 of metal or wood which are secured to the bottom of the side walls of said hatches upon which fits a removable circular board of plywood or Masonite 8. Spaced a short distance above boards 8 are similar boards 10 held spaced together by bolts 12 and adapted to accommodate inflatable rubber tubings 4 between said boards. When rubber tubings 4 (Fig. 8) are in place and properly inflated expansion thereof will take place horizontally towards the walls of the openings thus providing effective seals for possible entrance of outside moisture to the sugar in the car through the fill-hole hatches.

In the above descriptions of the attached drawings, the specific order of the three insulating layers overlaid on the side walls of the car and each other is dictated by the dominant characteristic required of each layer. That insulating layer immediately adjacent to the side wall of the car, the tempered Masonite cited above, resists penetration by moisture; the insulating material overlaid on the Masonite, the corkboard cited above, is relatively impervious to moisture and has a low valued coefficient of thermal conductivity; while the final insulating layer adjacent to the hygroscopic material and overlaying the corkboard, the plywood cited above, has a low valued coefficient of thermal conductivity and resists penetration by and disintegration due to moisture. The preferred thicknesses of these three insulating materials are Masonite, 5/16 inch; corkboard, three inches; plywood, 3/4 inch. However, variations of these values are contemplated.

The three overlaid insulating materials covering the interior surface of the car roof form a triple-layered insulating medium whose characteristics are like those of the triple-layered insulating medium covering the side walls of the car. Both tempered Masonite and plywood are located in the roof insulating medium as they are for the side wall covering but glass wool is used between the Masonite and plywood of the roof insulating medium instead of corkboard because the glass wool can be compressed, expanded or distorted to fit the irregular and curved contours of the roof surface. The glass wool is not used as insulating material for the car side walls because it may pack down or shift position during movement of the car.

Bulk hygroscopic materials transported in a sealed steel car whose walls and interior roof surfaces are covered by the respective triple-layered insulating media described above will not be subject to caking or contamination regardless of changes in external temperature or humidity.

Although the embodiment of this invention includes triple-layered insulating media it should be understood that a double layered insulating medium such as corkboard and plywood, with the former adjacent to the car interior surface would also provide appreciable condensation-resistant qualities. However for best results under the greatest range of circumstances the triple-layered media with the layers arranged in the sequence cited is preferred.

Although the insulating materials comprising the triple-layered insulating media described above are identified as tempered Masonite, corkboard, plywood and glass wool it should be understood that each of these materials is cited as a specific example of the generic class of materials to which it belongs and that other members of the respective generic classes can replace the materials cited.

Tempered Masonite is a dense, rigid and strong board that has a low valued coefficient of thermal conductivity, is cool to the touch, resists moisture penetration and is formed by compressing wood fiber. It is a member of the generic class of materials termed fiber board. Fiberboard is a heavy sheet material formed by matting, compressing or rolling fibers of wood or other cellulosic material with or without adhesives. Such materials may be classified as sheets of compressed bonded fibrous wood. Other members of this generic class of materials are given such trade names as "Electrite," "Thermax," "Temlok," etc.

Corkboard, made by compressing granulated cork is a rigid and strong heat insulating material of closed cellular structure which includes dead air spaces therein but without capillarity or tendency to absorb moisture. Closed cell sponge or foam rubber, closed cell sponge plastic made of polyvinyl chloride, mineral wool, synthetic resins etc., are materials with heat conductivity and moisture resistance characteristics like those of corkboard.

Plywood is a strong rigid laminated material made of several sheets of wood glued together so that the grain structures of successive layers are at some angle, usually a right angle, with respect to each other and is warm to the touch. Various grades of plywood are obtainable under the trade names "Plywall," "Plypanel," etc., and various chemicals may be included with the plywood layers.

Glass wool is a heat insulating material that may be made to take any desired shape and is formed by matting glass fibers. Mineral wool or rock wool made from fibers of molten rock are other members of this generic class.

Unique features of this invention are the means for sealing the fill-hatch cover and ensuring closure of the fill-hatch once the car is in motion. To prevent tampering, one of the locks of the hatch has a pivot which is welded in place rather than fixed in position by such means as cotter pins. A conventional seal secures the lock. When the fill-hatch is open the hatch cover rests against a specially placed and shaped stop that projects on the roof. The angle at which this stop maintains the hatch cover is such that when the car starts moving, its swaying motion throws the hatch cover off center and causes it to fall, thus closing the fill-hatch.

Another unique feature of this invention is the combination of two discharge gates that are thermally insulated from each other and that may be operated either together or singly, and the entire discharge gate or gates area being enveloped with a metal cover welded to the car structure which prevents all dirt, moisture, etc. kicked up by the fast rotating wheels of the car, etc., from finding their way into the interior of the car through the gates.

Other features include the novel means of moisture and temperature insulation of joints by nails with metal spring effect strips, removable insulating pillows between the upper and lower discharge gates with dead air spaces provided therebetween, removable rubber inflatable tubing secured on both lateral sides by insulating material and when inflated presses against the circular wall of the fill-hatch opening for effective sealing thereof, one-piece tailor-fit corner pieces of insulation material such as wood, all of which being directed to the objective of the transportation of hygroscopic materials without caking thereof due to moisture condensation, and including all the other objects referred to above.

In summary the invention described here is a means of transforming a car, and in particular a steel car, into a condensation-resistant car suitable for the transportation of granulated or powdered hygroscopic material such as sugar, salt, flour, chemicals, etc. This transformation is accomplished by covering the interior surfaces of the car walls and roof with triple-layered insulating media each layer of which has a specific function. That layer of the triple-layered insulating medium adjacent to the wall or roof has a low valued coefficient of heat conductivity but in particular is resistant to penetration by moisture and thus insulates any condensation on the car surface from the hygroscopic material. The center layer of the triple-layered insulating medium, because of its heat insulating and moisture characteristics, prevents the passage of heat or moisture towards or away from the hygroscopic material. The final layer of the triple-layered insulating medium, that nearest the hygroscopic material, has a low value coefficient of thermal conductivity and resists moisture penetration. The use of such triple-layered insulating media on all surfaces of the car makes it condensation-resistant and consequently inhibits the condensation of water vapor absorbed on the hygroscopic material.

The preferred form of the invention is illustrated in the accompanying drawings but it is to be understood that the invention is not limited to the exact details of materials of construction shown and described, for it is obvious that various modifications thereof, within the scope of the claims, will occur to persons skilled in the art.

I claim:

1. In a condensation-resistant car for transporting comminuted hygroscopic materials said car having top fill-hatches and bottom discharge gates and side and end steel walls leading to said discharge gates, comprising: a sheet of a non-metallic, non-porous vapor barrier material comprising compressed bonded fibrous wood lining the interior surface of the walls of said car, a layer of a porous non-metallic thermal barrier adjacent to said vapor barrier, and a layer of plywood adjacent said thermal barrier, securing means securing said layers and lining to said walls, said plywood being the surface contacted by the hygroscopic materials.

2. In a car for transporting comminuted bulk hygroscopic materials and for minimizing moisture condensation in said car which comprises: a metal car body, a first lining adjacent the interior walls of said metal car body of a moisture barrier comprising compressed bonded fibrous wood, a layer of cork adjacent said first lining, and a layer of plywood adjacent said layer of cork, and securing means securing said layers and lining to said metal car body.

3. In a condensation-resistant steel car for transporting bulk comminuted sugar said car having top fill-hatches in the car roof and bottom discharge gates and side and end steel walls leading to said discharge gates, comprising: a first lining of a non-metallic, non-porous vapor barrier material comprising compressed bonded fibrous wood adjacent to the roof interior surface of said car, a layer of glass wool adjacent said first lining, and a final layer of plywood adjacent said glass wool nearest the car interior, and securing means securing said lining and layers to said car roof.

4. A condensation-resistant steel car for transporting bulk comminuted sugar, said car having top fill-hatches and bottom discharge gates with side and end steel walls leading to said discharge gates comprising: a first lining of a moisture barrier material comprising compressed bonded fibrous wood adjacent the interior of said side walls, a layer of foamed rubber adjacent said first lining, and a layer of plywood adjacent said foamed rubber, said plywood being the surface contacted by the sugar being transported, and securing means securing said lining and layers to said steel walls.

5. A condensation-resistant steel car for transporting bulk comminuted sugar said car having top fill-hatches and bottom discharge gates with side and end steel walls leading to said discharge gates comprising: a first lining of a moisture barrier material comprising compressed bonded fibrous wood adjacent the interior of said side walls, a layer of sponge plastic adjacent said first lining, and a layer of plywood adjacent said sponge plastic, said plywood being the surface contacted by the sugar being transported, and securing means securing said lining and layers to said steel walls.

6. In a car for transporting comminuted bulk hygroscopic materials and for minimizing moisture condensation within said car which comprises: a sheet of a non-metallic, non-porous vapor barrier material comprising compressed bonded fibrous wood lining the interior surface of the walls of said car, a layer of a porous non-metallic thermal barrier adjacent to said vapor barrier, and a layer of plywood adjacent said thermal barrier, securing means securing said lining and layers to said walls, said plywood being the surface contacted by the hygroscopic materials.

References Cited in the file of this patent

UNITED STATES PATENTS

| Number | Name | Date |
| --- | --- | --- |
| 1,822,530 | Kind | Sept. 8, 1931 |
| 2,023,406 | Cartmill | Dec. 10, 1935 |
| 2,085,923 | Murphy | July 6, 1937 |
| 2,088,881 | Thompson | Aug. 3, 1937 |
| 2,186,700 | Johnson | Jan. 9, 1940 |
| 2,222,280 | Batho | Nov. 19, 1940 |
| 2,226,699 | Dietrichson | Dec. 31, 1940 |
| 2,386,702 | McBride | Oct. 9, 1945 |
| 2,612,849 | Lundvale | Oct. 7, 1952 |
| 2,642,818 | Talmey | June 23, 1953 |
| 2,647,473 | Lunde | Aug. 4, 1953 |